United States Patent [19]

Hershey, Jr. et al.

[11] 4,010,299

[45] Mar. 1, 1977

[54] MULTI-PANEL OUTSERT FOR ATTACHMENT TO A CONTAINER

[75] Inventors: Charles J. Hershey, Jr., Libertyville; George W. Lippincott, Zion, both of Ill.

[73] Assignees: Abbott Laboratories, North Chicago, Ill. ; by said Hershey; Nosco, Inc., Waukegan, Ill. ; by said Lippincott

[22] Filed: Aug. 25, 1975

[21] Appl. No.: 607,193

[52] U.S. Cl. .................................. 428/44; 428/138; 428/542; 428/195; 206/459; 206/494; 206/813; 229/74; 40/306; 40/310

[51] Int. Cl.[2] ...................... B32B 3/10; B32B 7/12; G09F 3/00; B65D 73/00

[58] Field of Search .......... 206/459, 460, 813, 494; 428/542, 131, 138, 44, 176, 195; 229/74, 72, 92.1

[56] References Cited

UNITED STATES PATENTS

| | | | |
|---|---|---|---|
| 1,896,834 | 2/1933 | Brown | 40/306 |
| 2,115,699 | 5/1938 | Boyd | 206/494 X |
| 2,192,268 | 3/1940 | Lane et al. | 206/813 X |
| 3,155,235 | 11/1964 | Maich | 206/813 X |
| 3,900,642 | 8/1975 | Michel | 438/138 X |

*Primary Examiner*—Philip Dier
*Attorney, Agent, or Firm*—Hill, Gross, Simpson, Van Santen, Steadman, Chiara & Simpson

[57] ABSTRACT

A multi-panel outsert suitable for attachment to the exterior of a product container has two or more longitudinal panels closed upon themselves by transverse folds and secured compactly by adhesive joining a spot on the inside of the outer longitudinal panel to an adjacent, outside portion of the outer panel which encloses and secures thereunder one or more other panels, affording increased printing area for the outsert with decreased likelihood of loss. An aperture through the panel or panels folded inwardly adjacent the outer panel allows such direct attachment of the outer panel to itself to effect the enclosure and securement.

7 Claims, 10 Drawing Figures

Fig. 1
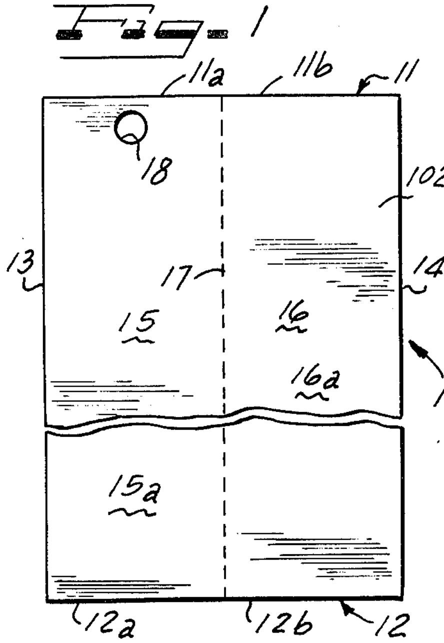
Fig. 2
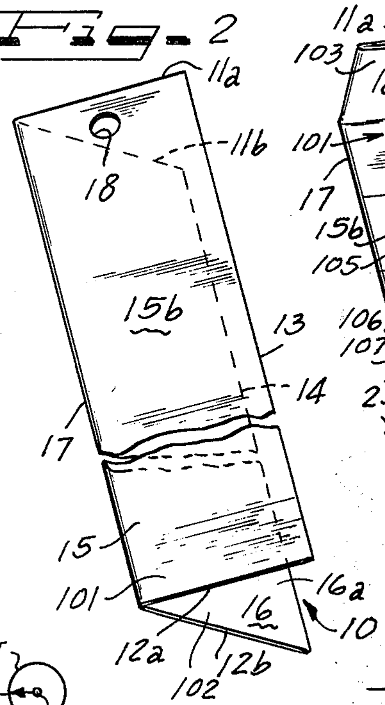
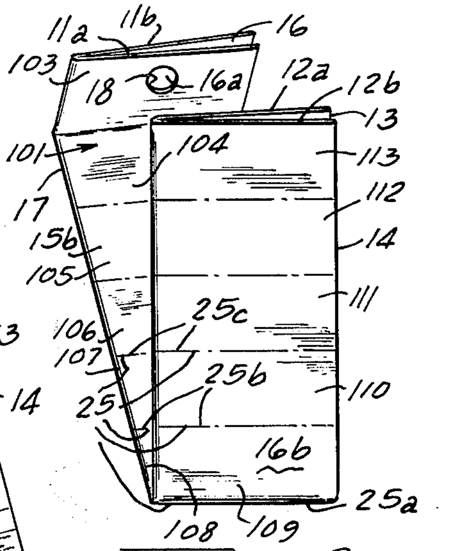
Fig. 3
Fig. 4
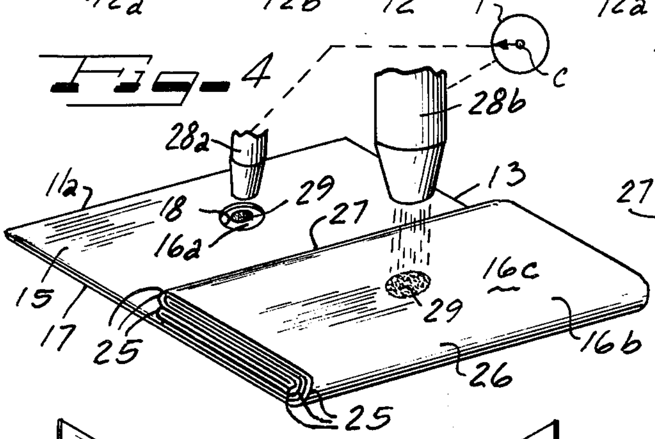
Fig. 5
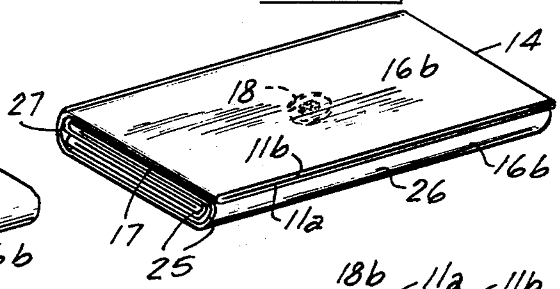
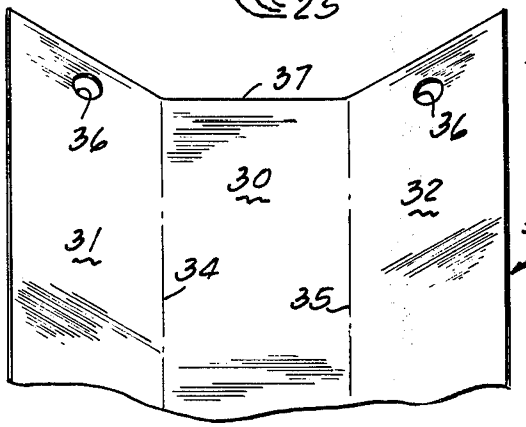
Fig. 6
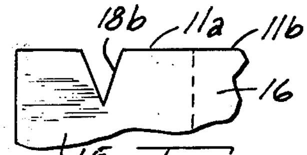
Fig. 8
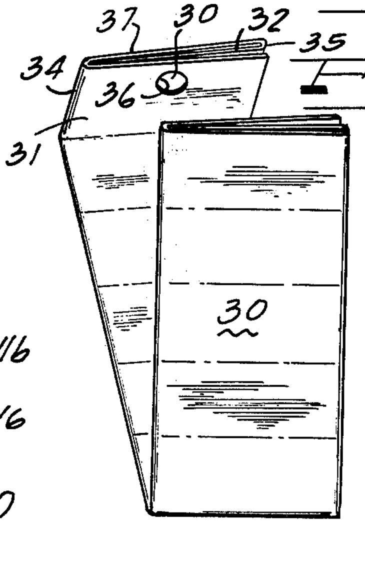
Fig. 7
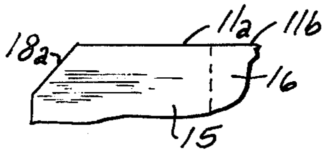
Fig. 9
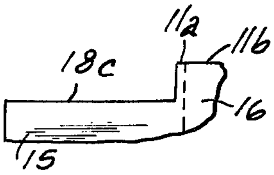
Fig. 10

MULTI-PANEL OUTSERT FOR ATTACHMENT TO A CONTAINER

BACKGROUND OF THE INVENTION

1. Field of the Invention

The invention relates to a method for folding and sealing a sheet of material into a compact, secure unit suitable for attaching to the exterior of a product, and the unit made thereby.

2. Description of the Prior Art

An "outsert" is a folded piece of thin paper containing printed information or instructions regarding a product or the contents of a container to which the outsert is to be affixed. Outserts must be firmly attached to the container so as not to be lost or displaced during handling. The outsert must also be closed upon itself to maintain the integrity of its folding and to prevent the folds from opening out, thus causing an increase in likelihood of loss, tearing, etc.

In the prior art, outserts have consisted of a single panel folded by parallel folds and sealed by the last flap. Where multiple panels have been used, edge and other seals and attachments such as staples have been used, with comparatively unsatisfactory results and expense.

SUMMARY OF THE INVENTION

In accordance with the principles of the present invention, a a foldable sheet is first divided into two or more longitudinal primary panels by one or more longitudinal fold lines running at right angles to parallel fold lines by which the outsert sheet is formed also into secondary panels. All but one of the primary panels are apertured near one end thereof. The sheet is folded along the longitudinal and parallel fold lines to form the sheet into a compact unit with all the primary apertured panels folded on one side of the unapertured panel, the apertures in the panels in register with one another, and the unapertured panel on the outside of the outsert. Adhesive is applied to the inside of the outer panel through the apertured panel(s) or to a corresponding position on the outer side of the outer panel atop the outsert unit, to join the outer panel to itself when the final fold of the last secondary panel is made.

BRIEF DESCRIPTION OF THE DRAWINGS

FIG. 1 is a fragmentary view of a sheet form workpiece in development, and showing an initial step of the method of making an outsert article.

FIG. 2 is a perspective view showing a second step of the method and the article workpiece in a corresponding stage of fabrication.

FIG. 3 shows the workpiece in a third stage of fabrication.

FIG. 4 shows alternative adhesive applying techniques in practicing the method of the invention.

FIG. 5 shows the workpiece as a completed outsert.

FIG. 6 shows an alternative form of a workpiece using multiple panels at right angles to the parallel folds.

FIG. 7 shows the workpiece in a subsequent stage of fabrication.

FIGS. 8, 9, and 10 are fragmentary views of alternate structural forms of the invention using different openings through which adhesive may be applied.

DESCRIPTION OF THE PREFERRED EMBODIMENTS

A sheet form workpiece made of material such as thin paper is shown at 10 in FIG. 1. The sheet 10 has a surface 101 and surface 102 on opposite sides for bearing indicia consisting of illustrations and textural matter giving instructions regarding or descriptions of a product or contents of a container to which an outsert is to be affixed. The sheet or workpiece 10 has an upper edge 11, a lower edge 12, a left edge 13, and a right edge 14.

The original flat workpiece article 10 is divided into two panels 15 and 16 each having a first and a second surface 15a and 15b, and 16a and 16b, respectively, by a longitudinal fold line 17. The panels 15 and 16 have respective edges 11a and 11b at their upper ends and 12a at their lower ends.

In accordance with this invention, a through opening is formed in all of the panels except one. Thus, in the form of the invention shown in FIG. 1 wherein a two-panel species is illustrated, a through opening is formed in one of them. The through-opening may take various structural shapes and configurations. However, one form which is particularly convenient to make and which lends itself to the principles of the invention is to form an aperture near the top or the bottom of the selected panel. Thus, in the form of the invention shown in FIG. 1, an aperture 18 is formed in and through panel 15 near edge 11a thereof.

The through opening 18 may also be in the form of a corner cut 18a, a "V"-or other-shaped notch 18b, a punched hole as shown at 18, a series of such holes, or a narrow transverse strip 18c, as shown in FIGS. 8 through 10.

In FIG. 2 the panels 15 and 16 are folded along the longitudinal fold line 17, so that the edges 13 and 14 will overlie one another and the first panel surfaces *15a* and *16a* of the respective panels will confront or overlie one another. A portion of the surface 16a near the upper edge 11b thereof will be exposed through the panel 15 via the through opening or aperture 18 in that panel.

In FIG. 3, a plurality of parallel folds transverse or at right angles to the longitudinal fold 17 are shown at 25 and divide each respective panel into a corresponding plurality of panel sections, for example, separate sections 103 –113 inclusive. These folds may be spaced apart any desired distance, depending on the desired final size of the completely folded outsert, with allowance for the accumulating thickness of the material 10 as aggregated through multiple folds. As shown in FIG. 3, the first fold *25a* reveals an undersurface *16b* the panel 16. This fold *25a* also brings portions of the second surface *15b* of the panel 15 together. Successive folds may be made as on lines *25b* or *25c*, closing the second surface *16b* of panel 16 upon itself.

Any convenient order of folding may be followed, so long as, in accordance with the principles of the present invention, the uppermost part *16c* of the second surface *16b* of the panel 16 extends from the top of the folded outsert as shown in FIG. 4 around the folds 25 as at 26 opposite from the upper edge *11a* of the panel 15, as opposed to extending around all the folds 25 as at 27, adjacent the exposed surface *15b*.

As disclosed in FIG. 4, the final step before sealing of the outsert is application of an adhesive product 29 to join the surfaces *16a* and *16b* through the panel 15 at the through opening or aperture 18. This step may be accomplished by means of a glue gun 28*a* having a discharge nozzle, or needle jet in alignment with the through opening and positioned to project a supply of adhesive through the opening 18 and against the inside surface 102 of the outside panel 16*b*.

Application of the adhesive is timed as to onset and cutoff by means of an electronic timer shown schematically at T and having adjustable controls shown at C.

Alternatively, a gun shown at 28*b* may apply glue 29 to the surface 16*b*. The gun 28*b* has a needle jet disposed in a position to deposit the adhesive on the surface 16*b* in register with the position of the aperture 18 when the edge 11*a* of the panel 15 is brought into adjacency with the fold 26 on the surface 16*b*. Thus, the adhesive-coated surface projects the adhesive through the opening and against the inside surface of the outside panel.

It should be noted that folding of the panels of the sheet 10 may be accomplished in any order, and with any number of panels defined by transverse fold lines 25, so long as the fold is made along the longitudinal fold line 17 when at least three transverse fold panels remain to be folded together, including the end panel 103. It is also possible to define any number of transverse fold panels, whether odd or even, providing only that a workpiece similar to that shown in FIG. 4 is provided as a final step before application of adhesive material and sealing. As shown in FIG. 5, the completed workpiece constitutes an outsert embodying the principles of the present invention with a single outer surface wrapped upon itself and with no free edges exposed to be caught and torn or dislodged.

In accordance with the principles of the present invention, an outsert may be provided with more than two panels. As disclosed by FIG. 6, a workpiece is shown having three panels 30, 31, and 32 provided in a sheet form article 33. The panels 30 and 31 are separated by a longitudinal fold line 34, while the panels 30 and 32 are separated by a longitudinal fold line 35 parallel to line 34. All of the panels but one are provided with through openings as at 36, 36 near one end 37 of the sheet 33. Any arrangement of these apertures 36 in the panels 30, 31, 32 of the sheet 33 may be provided, providing only that the panels may be folded so the apertures 36 register with one another when folded so that the non-apertured panel, in this case panel 30 is on one side of all the apertured panels 31, 32 after the longitudinal folds have been made, as in FIG. 7.

In other respects the workpiece 33 is completed to form an outsert in accordance with the steps and procedures already described.

In both forms of the invention, the method of making the outsert is characterized by initially forming a selected number of through openings ($n$) through a sheet form member in transversely spaced relation near one longitudinal end of the article. The sheet form member is then folded longitudinally to form $n + 1$ panels and with the through openings, if there be more than one, in aligned register with one another to form $n$ panels with surfaces interrupted by the through openings and one panel with an unbroken surface.

The panels are then folded transversely to form a plurality of panel sections overlying one another and an adhesive is applied between the innermost surface of the unbroken panel and the outermost surface of the body of the folded article at the through openings. The surfaces are then joined through the through openings to secure the outsert in assembled relationship with one another. In the first form of the invention $n$ equals 1 and, of course, in the second form of the invention, $n$ equals any number greater than 1. In both forms of the invention, the finished outsert article is characterized by the provision of an adhesive between one side of the unbroken surface and the opposite side of that surface of the folded article at a location adjacent thereto through the through opening to secure the article in folded-together relationship.

Although various minor modifications might be suggested by those versed in the art, it should be understood that I wish to embody within the scope of the patent warranted hereon all such modifications as reasonably and properly come within the scope of my contribution to the art.

I claim as my invention:

1. An outsert comprising:

a sheet form article having flat surfaces on opposite sides for bearing indicia, at least one longitudinal fold formed in said article to partition the article into a plurality of panels overlying one another, a through opening in each of said panels except one outside panel and said through opening being formed near one end of said article corresponding to a top or a bottom of the article, a plurality of parallel folds disposed at right angles to said longitudinal fold to partition the article into a plurality of panel sections overlying one another, said parallel folds being made so that inside surface of the said outside panel is in registered adjacency with the outside surface of the outer panel on the body of the completely folded outsert through said through opening, and an adhesive between said inside and said outside surfaces at said through opening to secure the folded panels into an integral unit.

2. An outsert comprising, a sheet form member having $n + 1$ longitudinally extending panels folded to overlie one another with said 1 panel being disposed on the outside of the article, a through opening extending through $n$ panels so that said 1 panel has an unbroken surface disposed opposite said through opening, said article being folded transversely to divide the panels into compact sections overlying one another, and an adhesive between said unbroken surface and the surface of the folded article adjacent thereto through the through opening, thereby to secure the article in folded together relationship.

3. An outsert as defined in claim 2 wherein said through opening comprises an aperture formed inwardly of one edge of the article.

4. An outsert as defined in claim 2 wherein said through opening comprises a notch extending inwardly from one edge of the article.

5. An outsert as defined in claim 2 wherein said through opening comprises a relief recess cut in the respective corners of each panel.

6. A multiple-paneled outsert in which all panels but one have means forming an aperture therethrough near a longitudinal end thereof, and the panels are folded longitudinally and transversely into compact form in which the one non-apertured panel surrounds the apertured panels and the folds thereof and is sealed to itself by adhesive through the apertures enclosing said apertured panels.

7. An outsert, suitable for affixing to the exterior of a product container, comprising:

a foldable sheet having first and second flat surfaces;

a plurality of primary panels formed in the sheet by at least one fold line running in a longitudinal direction of the sheet;

a means defining an aperture formed in each of all but one of the primary panels;

at least three secondary panels formed in the sheet by at least two fold lines running at right angles to the longitudinal fold lines;

the sheet being folded on said longitudinal and transverse fold lines into a compact unit having an outer surface comprised of the second surface of the non-apertured primary panel and all the aperture means being in register together inwardly of the second surface; and adhesive means applied to one of the first surface of the non-apertured panel through the aperture means in the adjacent primary panels and the second surface of the non-apertured panel in register with the position of the aperture means when the non-apertured panel is folded into adjacency therewith, thereby to affix the first surface of the non-apertured panel to the second surface thereof to seal the outsert compactly to diminish possibilities of loss and damage to the outsert and the panels thereof.

* * * * *

UNITED STATES PATENT AND TRADEMARK OFFICE

CERTIFICATE OF CORRECTION

PATENT NO. : 4,010,299

DATED : March 1, 1977

INVENTOR(S) : Charles J. Hershey, Jr. et al.

It is certified that error appears in the above-identified patent and that said Letters Patent are hereby corrected as shown below:

Column 1, line 30, erase second occurrence of "a".

Column 2, line 53, insert --of-- after "16b".

Column 4, claim 1, line 33, after "that" insert --the--.

Signed and Sealed this

Twenty-eighth Day of June 1977

[SEAL]

*Attest:*

RUTH C. MASON
*Attesting Officer*

C. MARSHALL DANN
*Commissioner of Patents and Trademarks*